Aug. 5, 1952     D. L. MILLER     2,605,642
ENGINE STARTER DRIVE
Filed June 25, 1951
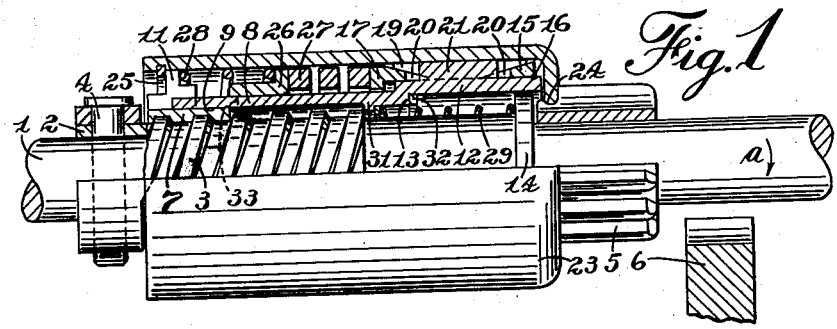
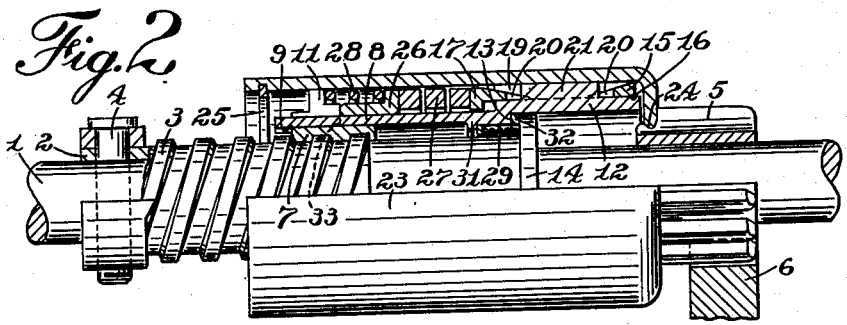
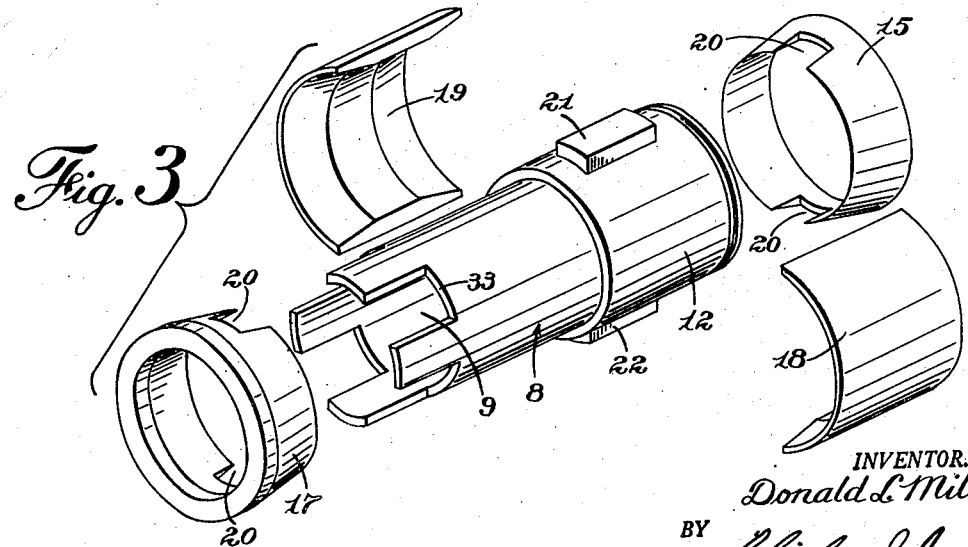
WITNESS:
INVENTOR.
Donald L. Miller
BY
ATTORNEY Patented Aug. 5, 1952

2,605,642

UNITED STATES PATENT OFFICE 2,605,642

ENGINE STARTER DRIVE

Donald L. Miller, Horseheads, N. Y., assignor to Bendix Aviation Corporation, a corporation of Delaware Application June 25, 1951, Serial No. 233,429

3 Claims. (Cl. 74—7)

The present invention relates to an engine starter drive and more particularly to an automatically meshing gearing having a yielding self-tightening clutch connection which is arranged to release and overrun with a controlled amount of frictional drag when the engine starts.

In many of the types of starting equipment in which engagement of the gearing is consequent to the energization of the starting motor, it is desirable to definitely limit the peak torque load on the drive in order to obviate the necessity of using factors of safety higher than required for the normal cranking operation.

It is also desirable to control the amount of torque transmitted back through the pinion when the engine starts, in order to slow down the demeshing action and prevent the pinion from being demeshed by sporadic firing of the engine while insuring reliable demeshing action when the engine is truly self-operative.

It is an object of the present invention to provide a novel starter drive in which a single frictional connection serves to perform both the above stated functions.

It is another object to provide such a device incorporating further means for insuring proper meshing of the gearing when the starting motor is energized.

It is another object to provide such a device which is a self-contained unit of small diameter but having adequate rotational inertia to insure satisfactory meshing operation.

Further objects and advantages will be apparent from the following description taken in connection with the accompanying drawing in which:

Fig. 1 is a side elevation partly in section of a preferred embodiment of the invention showing the parts in normal or idle position;

Fig. 2 is a similar view showing the parts in cranking position; and

Fig. 3 is a detail in perspective of the sleeve member and clutch elements shown disassembled.

In Fig. 1 of the drawing there is illustrated a power shaft 1 on which a hollow shaft 2, which is threaded for a portion of its length as shown at 3, is fixedly mounted in any suitable manner as by means of a cross pin 4. A pinion 5 is slidably mounted on the power shaft 1 beyond the end of the screw shaft 2 for longitudinal movement into and out of mesh with a gear 6 of the engine to be started.

A control nut 7 is threaded on the screw shaft 2, and a sleeve 8 (Fig. 3), is slidably mounted at one end on the control nut and is provided with slots 9 which receive projections 11 extending radially from the control nut so as to form a splined connection between the control nut and sleeve. A portion 12 of the sleeve near its opposite end is enlarged so as to form an internal shoulder 13, and is arranged to bear slidably on a radial flange 14 formed on the end of the screw shaft.

A conical expander ring 15 is anchored on the end of the sleeve 8 by means of a lock ring 16, a second expander ring 17 is slidably mounted on the sleeve, and a pair of cylindrical clutch shoes 18, 19 are mounted on the sleeve between the expander rings and formed with flared ends to correspond with the conical surfaces of said rings. Means for preventing rotation of the clutch shoes and expander rings on the sleeve is provided in the form of keys or splines 21 and 22 rigidly mounted or formed on the periphery of the enlarged portion 12 of the sleeve, between the clutch shoes 18, 19, and entering slots 20 in the expander rings so as to spline them to the sleeve.

A barrel member 23, anchored at one end to the pinion as shown at 24, surrounds the sleeve and clutch members and bears at its other end on the projections 11 of the control nut 7, being retained thereon by a lock ring 25.

Means are provided for transmitting pressure from the control nut to the expander ring 17 to cause the rings to force the clutch shoes into frictional engagement with the interior of the barrel 23. As here shown this means comprises a spacing ring 26 slidably mounted on the sleeve in position to be engaged by the projections 11 of the control nut, and a heavy compression spring 27 located between the spacing ring and the expander ring 17. The spacing ring 26 is yieldingly held separated from the control nut 7 as shown in Fig. 1 by means of a light mesh-enforcing spring 28 which rests at its ends on the spacing ring and control nut.

Means normally holding the drive in idle position is provided in the form of an anti-drift spring 29 located between the flange 14 of the screw shaft and an interior shoulder 31 formed in the sleeve.

In operation, starting with the parts in the positions illustrated in Fig. 1, rotation of the power shaft in the direction of the arrow $a$ causes the control nut 7 to be traversed to the right on the threads 3 of the screw shaft 2, which movement is transmitted through the mesh-enforcing spring 28, spacing ring 26 and clutch spring 27 to the expander ring 17. This pressure causes the clutch shoes 18, 19 to engage the interior of the barrel, and is also transmitted through the expander ring 15 and lock ring 16 to the sleeve 8, the end of which bears against the anchorage of the barrel 23 with the pinion 5, thereby moving the pinion into mesh with the engine gear 6.

If a tooth of the pinion abuts against a tooth of the engine gear, the mesh-enforcing spring 28 yields and provides a time interval during which the torque will be built up sufficiently to index the pinion teeth into registry with the tooth spaces of the engine gear.

The meshing movement of the spring 28 and its associated parts is limited by engagement of the shoulder 13 of the sleeve with the stop flange 14 of the screw shaft, a thrust ring 32 being preferably interposed therebetween. The continued movement of the control nut 7 causes it to engage the spacing ring 26 after compression of the mesh enforcing spring 28, whereupon the clutch spring 27 transmits increased pressure to the expander ring 17 causing the clutch shoes 18, 19 to frictionally engage the interior of the barrel 23 for transmitting cranking torque to the pinion. The pressure of the spring 27 is limited by the engagement of the projections 11 of the control nut against the bottoms 33 of the slots 9 in the sleeve 8. The torque capacity of the clutch is thus limited to a predetermined value, above which the clutch slips and thereby protects the drive from excessive stresses.

When the engine starts, the acceleration of the pinion 5 by the engine gear causes the control nut 7 to thread itself back along the screw shaft 2. The first effect of this movement is to relieve the pressure on the clutch spring 27 and therefore reduce the frictional engagement of the clutch shoes with the interior of the barrel. Sudden accelerations of the pinion by sporadic explosions of the engine therefore cause the clutch members to slip and allow the pinion and barrel to overrun without becoming completely demeshed. When the engine becomes truly self-operative, however, the continued rotation of the pinion and barrel is transmitted as a frictional drag to the sleeve 8 which drag is increased by the action of centrifugal force on the clutch shoes 18, 19 as the speed of rotation increases. This rotation is transmitted through the sleeve to the control nut 7 causing it to thread itself back to idle position where it is maintained by the action of the anti-drift spring 29.

Although but one form of the invention has been shown and described in detail it will be understood that other embodiments are possible and that changes may be made in the design and arrangement of the parts without departing from the spirit of the invention.

I claim:

1. In an engine starter drive a power shaft, a screw shaft, fixed thereon, a pinion slidably journalled on the power shaft for movement into and out of mesh with a member of an engine to be started, a control nut threaded on the screw shaft, a sleeve having a splined connection with the control nut, a conical expander ring anchored on the end of the sleeve, a second expander ring splined to the sleeve, a plurality of clutch shoes non-rotatably mounted on the sleeve between the expander rings, a barrel member surrounding the clutch shoes, anchored to the pinion at one end and bearing on the control nut at the other, means for limiting the longitudinal movement of the sleeve, and means including a compression spring between the control nut and the second expander ring for causing the expander rings to force the clutch shoes into frictional engagement with the interior of the barrel.

2. An engine starter drive as set forth in claim 1 in which the sleeve is provided with a stop for arresting the meshing movement of the control nut, thereby limiting the compression of said spring, and consequently limiting the pressure of the clutch shoes against the interior of the barrel.

3. An engine starter drive as set forth in claim 1 in which the last mentioned means includes a spacing ring between the control nut and compression spring, and a mesh-enforcing compression spring seated on the control nut and spacing ring normally holding them apart.

DONALD L. MILLER.

No references cited.